J. A. LEIGHTON.
HEN'S NEST.
APPLICATION FILED MAY 31, 1912.
1,111,310.
Patented Sept. 22, 1914.
3 SHEETS—SHEET 1.
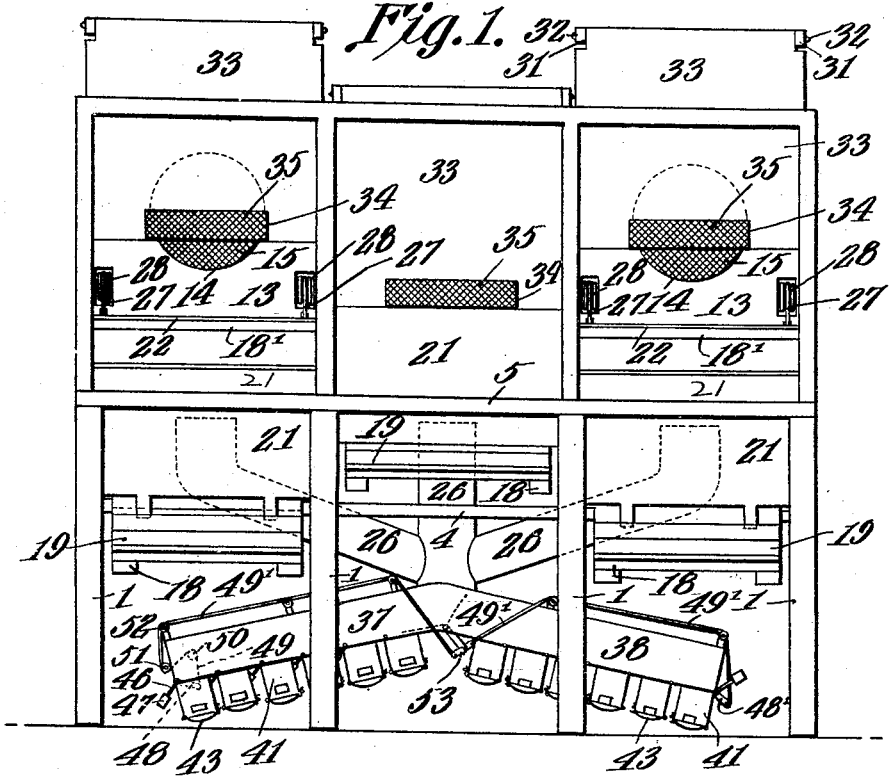
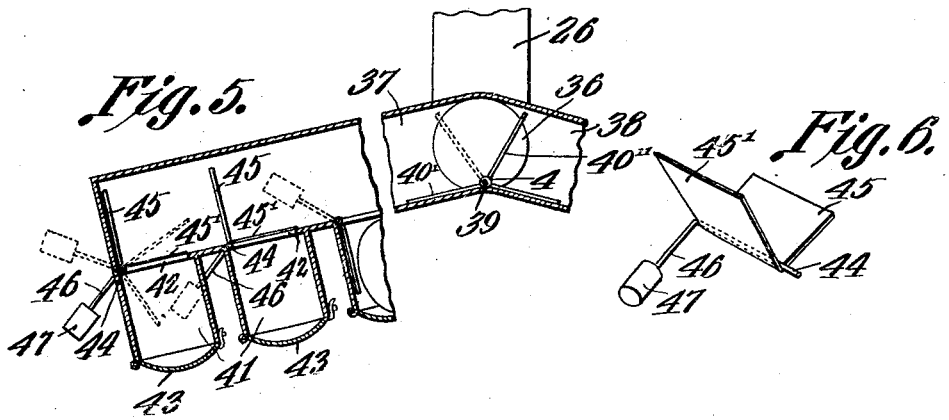
Witnesses
J. A. Leighton,
Inventor
by C. A. Snow & Co.
Attorneys J. A. LEIGHTON.
HEN'S NEST.
APPLICATION FILED MAY 31, 1912.
1,111,310.
Patented Sept. 22, 1914.
3 SHEETS—SHEET 2.
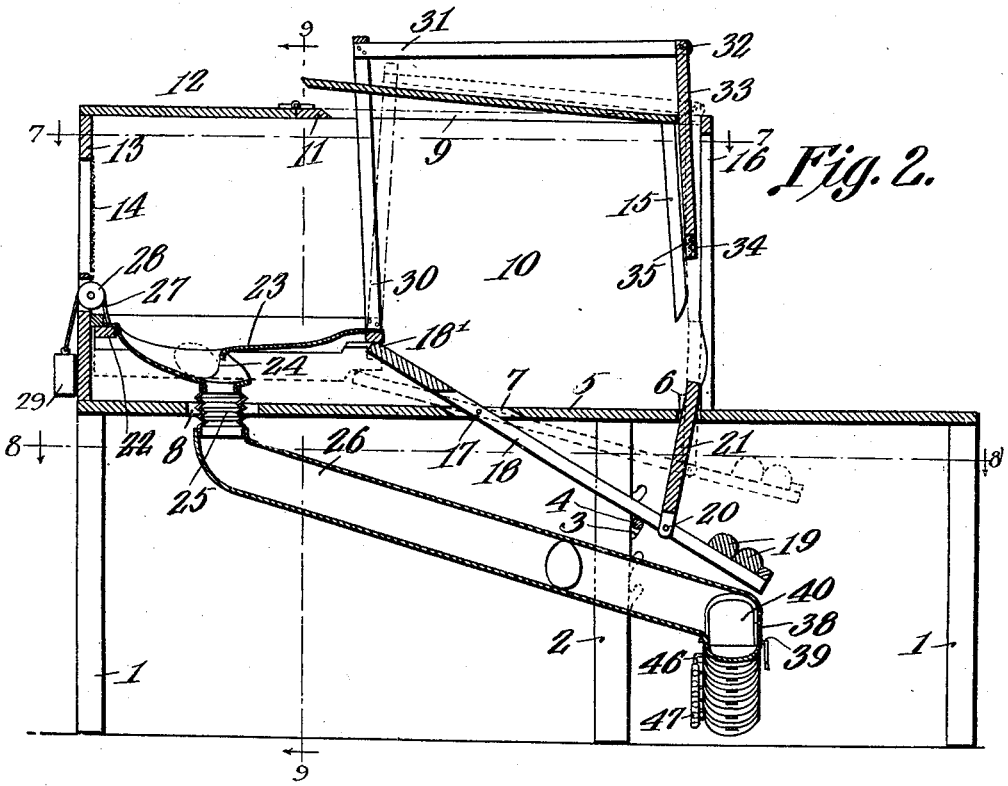
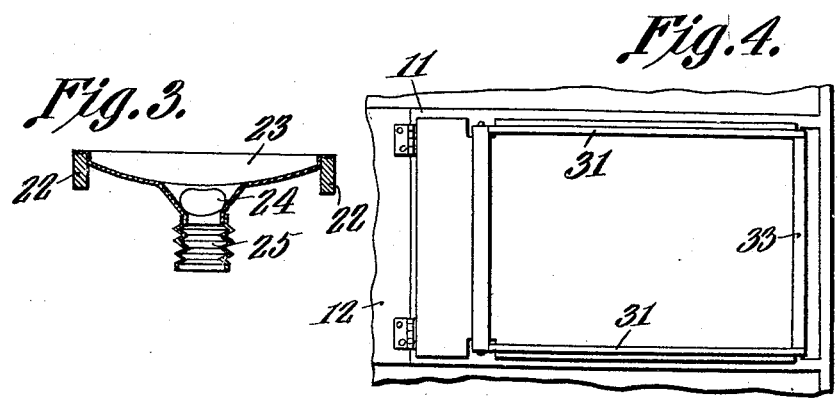
J. A. Leighton,
Inventor
by C. A. Snow & Co.
Attorneys
Witnesses J. A. LEIGHTON.
HEN'S NEST.
APPLICATION FILED MAY 31, 1912.
1,111,310.
Patented Sept. 22, 1914.
3 SHEETS—SHEET 3.
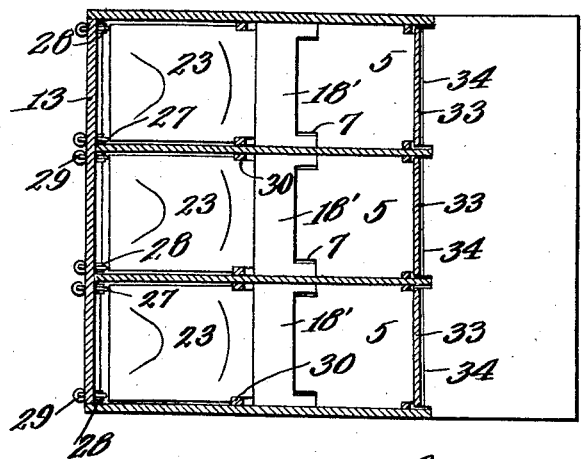
Fig. 7.
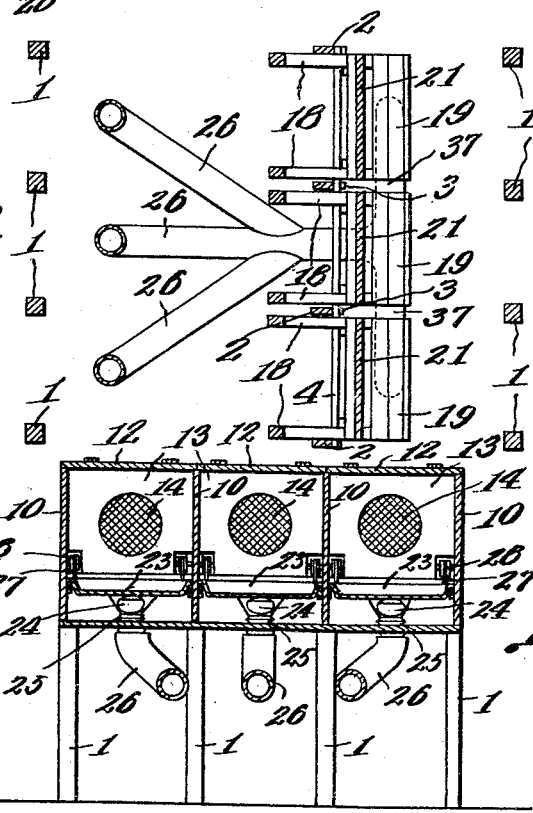
Fig. 8.
Fig. 9.
Witnesses
J. A. Leighton, Inventor
by C. A. Snow & Co.
Attorneys

UNITED STATES PATENT OFFICE.

JAMES A. LEIGHTON, OF ESTHERWOOD, LOUISIANA, ASSIGNOR OF ONE-HALF TO WILEY GREENLY SWEEZY, OF CROWLEY, LOUISIANA.

HEN'S NEST.

1,111,310.  Specification of Letters Patent.  Patented Sept. 22, 1914.

Application filed May 31, 1912. Serial No. 700,765.

*To all whom it may concern:*

Be it known that I, JAMES A. LEIGHTON, a citizen of the United States, residing at Estherwood, in the parish of Acadia and State of Louisiana, have invented a new and useful Hen's Nest, of which the following is a specification.

The present invention relates to improvements in hens' nests, the primary object of the invention being the provision of a novel form of hen's nest provided with two vertically movable and co-acting doors or gates, which when the nest is occupied by the hen are held in closed position, and which due to the removal of the hen from the nest will automatically open to permit of the egress of the hen therefrom and the passage inwardly of another hen.

With the foregoing and other objects in view which will appear as the description proceeds, the invention resides in the combination and arrangement of parts and in the details of description hereinafter described and claimed, it being understood that changes in the precise embodiment of the invention herein disclosed can be made within the scope of what is claimed without departing from the spirit of the invention.

In the drawings—Figure 1 is a front elevation of a battery of three nests made according to and embodying the present invention, the central nest having the doors in the position they assume when the nest is occupied. Fig. 2 is a longitudinal sectional view through one of the nests and the egg delivery mechanism, dotted lines showing the position of the parts when the nest is occupied. Fig. 3 is a central cross section through the nest *per se*. Fig. 4 is a top plan view of the upper portion of the nest showing the means for operating the upper door. Fig. 5 is a longitudinal sectional view through one member of the egg collecting device. Fig. 6 is a detail perspective view of one of the egg actuated cut offs. Fig. 7 is a section taken on line 7—7 of Fig. 2. Fig. 8 is a section taken on line 8—8 of Fig. 2. Fig. 9 is a section taken on line 9—9 of Fig. 2.

In the drawings, the numeral 1 designates the supporting standards for the main platform of the present device, which has also attached thereto the intermediate standards 2 which are provided with the off-set lugs 3 which constitute a rest or support for the transverse rods 4, the purpose of which will presently appear.

The platform 5 which is supported by the standards 1 and 2 is provided with the forward transverse slot 6, the transverse aperture 7 and the circular aperture 8, as clearly shown in Fig. 2. Carried by the platform 5 are the longitudinal partitions or walls 9 which provide a plurality of compartments as shown in Fig. 1, although it is obvious that a single compartment 10 may be employed. The strip 11 connects the upper edges of the transverse partitions and provides a means for supporting the hinged top or cover 12, which thus provides a means of access to the nesting portion of the apparatus. Mounted in the rear between the partitions 9 of each compartment is a wall 13, whose aperture 14 is closed by means of the screen 15, as clearly shown in Fig. 2, thus providing a means of ventilation for the occupant of the nest. Mounted upon the forward edges of the partitions or walls 9 are the two co-acting strips 15' and 16 which provide a guiding means for the upper movable gate or door 33, while the transverse slot 6 provides a guiding means for the lower movable gate or door 21. By this means as will presently appear, the forward open end of each of the respective compartments is closed while the nest is occupied. Pivoted at 17 is the nest actuated and weight returned lever 18, whose upper end 18' is normally in engagement with the nest carrying frame 22, while in the lower end, as at 19, are carried weights which normally hold the lever 18 in the position as shown in Fig. 2, when the nest 23 is elevated and unoccupied. The gate 21 is pivotally connected, as at 20, to the lower end of the lever 18. The rectangular nest carrying frame 22 is mounted in the rear portion of the compartment and is capable of a vertical movement up and down, the upward movement being limited by means of the stop 22'. The concaved nest 23 is supported by the frame 22 and is provided with the peculiar shaped and positioned egg outlet aperture 24, which is positioned to deliver the egg through the bellows connection 25 into the upper end of the egg directing inclined tube 26.

In order to assist in the proper vertical movement of the nest frame 22, the flexible connections 27 are connected to the rear of the frame 22 and pass over the pulleys 28, said connection having fastened to the outer ends thereof weights 29 exteriorly of the nest. By this means when the nest is occupied, the frame 22 will be moved downwardly in a vertical direction, such downward movement due to the weight of the hen upon the nest causing the depression of the upper end 18' of the lever 18 and the consequent elevation of the gate 21 to the dotted line position Fig. 2.

In order to properly move the upper gate or door 32 downwardly and in co-active relation with the lower gate or door 21, the vertical standards 30 are connected to the frame 22 at each side thereof, and by reason of the two plates or rods 31, which are pivotally connected at 32 to the upper end of the upper gate or door 33, the movement of the nest frame operates the door 33 to close the compartment and thus provide a means to prevent the hen upon the nest from being disturbed by other hens, and yet at the same time to permit of the opening and closing of the respective gates 21 and 33 at such distance from the hen as to not startle it.

The forward section 12' of the cover or roof of each separate nest, is pivoted to and between the vertical standards 30, while the forward end is free to rest above the guides 15, so that when the standards 30 are elevated, as shown in Fig. 2, the rear end of the section 12' will be elevated above the strip 11 while the forward edge will rest upon the guides 15 and thus the section 12' will be out of parallel with the plates or rods 31.

To provide ventilation throughout the length of the compartment, so that the nest may be used not only as a laying nest but as a setting nest for hatching eggs, a recess 34 is provided in the lower edge of the upper gate or door 33 and has stretched thereacross the netting or screen 35.

As clearly shown in Fig. 1, the egg conducting tubes 26 all converge and deliver the eggs through the aperture 36 into either one of the diverging tubes 37 or 38, the direction of the passage of the egg being controlled through the medium of the cut-out device 40 which is pivoted at 39 at the junction of the two tubes 37 and 38, and this cut-out is provided with the two plates 40' and 40'', which will assume either the full or dotted line position, Fig. 5, the full line position causing the eggs delivered from the tube 26 to be delivered into the tube 37.

Each of the respective tubes 37 and 38 are provided with apertures 42, in the bottom walls thereof, each aperture leading to its respective egg cup or receptacle 41, and of such a size as to receive a single egg at a time, the same being provided with the removable lower cover 43, whereby the egg may be removed.

Each receptacle 41 is provided with the egg controlled cut-out device which is pivoted at 44 so that either one of the plates 45 or 45' will be positioned to close the aperture 42, the passage of the egg upon the plate 45 causing the depression thereof, as clearly shown in Fig. 5, such depression with the egg within the receptacle 41 presenting the plate 45, so that the same will seal the aperture 42, and thus permit the next egg to pass to the receptacle 41 therebelow. In order to normally hold the plate 45 upwardly when the receptacle 41 is unoccupied, and thus seal the aperture 42 with the plate 45', a rod 46 carrying a weight 47 is provided, the weight being of such a size as to be overbalanced by the disposition of an egg on the plate 45 and within the pocket 41. The pocket 41 is of such a size, however, as when occupied to permit the egg at all times to engage the plate 45' and thus retain the plate 45 as the closure of the aperture to the occupied compartment 41.

Each of the respective compartments or cups 41 are provided with the sight apertures $a$ whereby the egg collector may at a glance see the egg within the same.

In order to provide a means to be actuated by the last egg which is fed to the tube 37 so as to prevent the introduction of another egg therein and at the same time to deliver the next succeeding eggs into the tube 38, a lever 48 is connected to the end 44 of the last cut-out device and has connected thereto a flexible connection 49 which is trained over the respective pulleys 50, 51 and 52 so that the other end thereof is connected to the lever 53 of the cut-out 40; the flexible connection 49' being also connected to the lever 53 and to the arm 48' at the extreme end of the tube 38. By this means the delivery of an egg into the last pocket 41 will actuate the cut-out 40 to the dotted line position Fig. 5, and thus cause the egg to be delivered to the tube 38.

What is claimed is:—

A hen's nest, having a casing, a vertically movable nest disposed therein, a lever pivoted in the casing and having its upper end disposed to engage the under forward edge of the nest, a weight upon the lower end of the lever for normally holding the forward edge of the nest elevated, a weight connected to the rear end of the nest for coacting with the weighted lever to elevate and hold the complete nest in the same plane, a lower door pivoted to the lever adjacent the weighted end thereof and disposed to be moved upwardly into closing position, an upper door mounted to move to and from the lower door, and means connected to the upper door and to the forward edge of the nest, whereby when the nest is occupied, the two doors are moved toward each other, said doors separating when the nest is unoccupied due to the elevation of the nest through the weighted lever.

In testimony that I claim the foregoing as my own, I have hereto affixed my signature in the presence of two witnesses.

JAMES A. LEIGHTON.

Witnesses:
DAN J. TEITRL,
J. PILOFF.

Copies of this patent may be obtained for five cents each, by addressing the "Commissioner of Patents, Washington, D. C."